Sept. 12, 1950 W. C. DOLD 2,522,102
INFUSION APPARATUS
Filed Oct. 7, 1947 3 Sheets-Sheet 1

INVENTOR:
William C. Dold
BY Kegan and Kegan
Att'ys

Sept. 12, 1950 W. C. DOLD 2,522,102
INFUSION APPARATUS
Filed Oct. 7, 1947 3 Sheets-Sheet 2
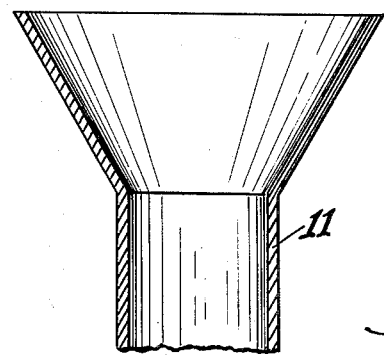
Fig. 2
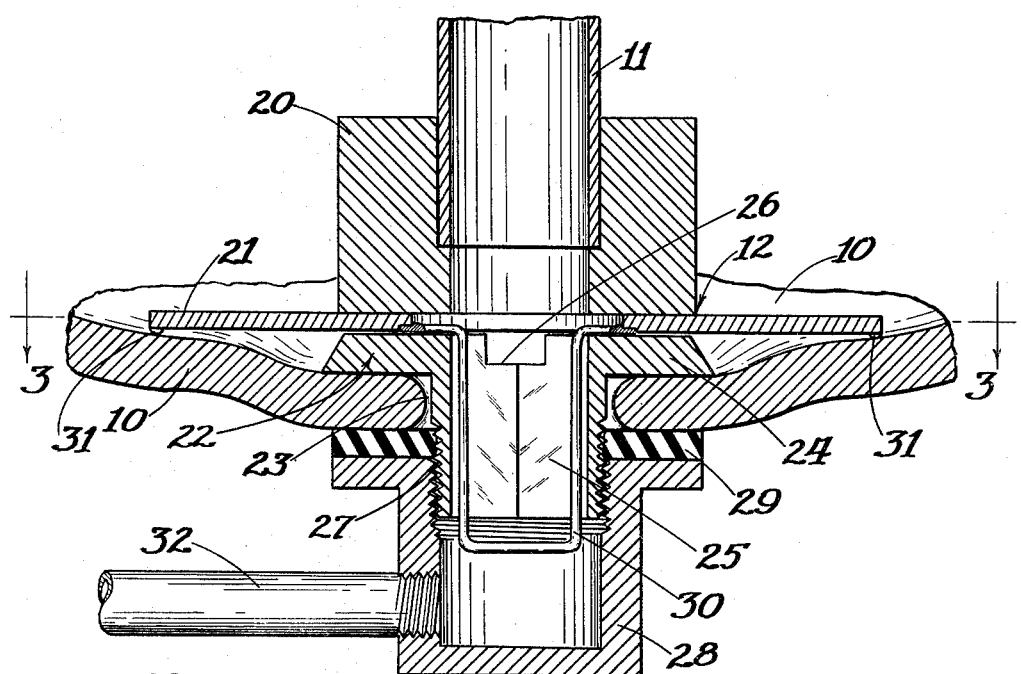
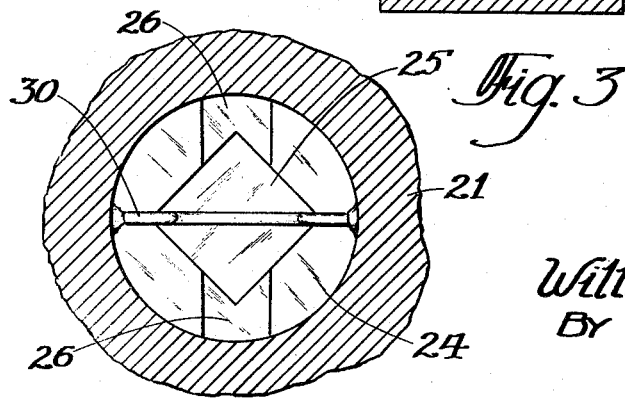
Fig. 3
INVENTOR:
William C. Dold
BY Kegan and Kegan
Attys Sept. 12, 1950 W. C. DOLD 2,522,102
INFUSION APPARATUS
Filed Oct. 7, 1947 3 Sheets-Sheet 3
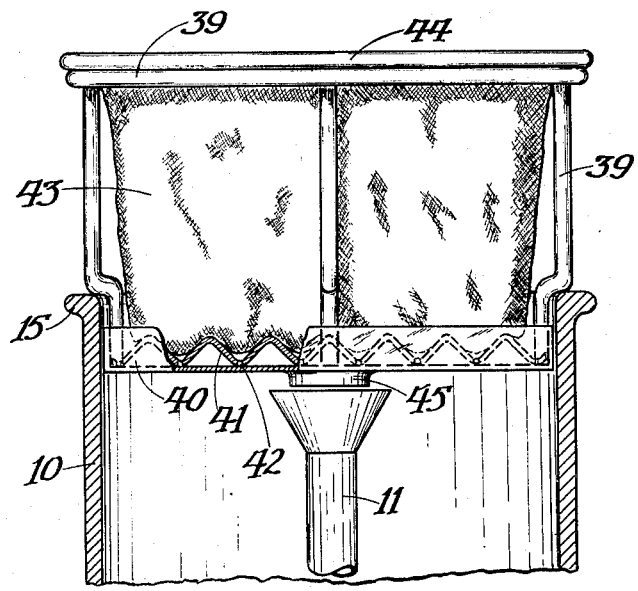
Fig. 7
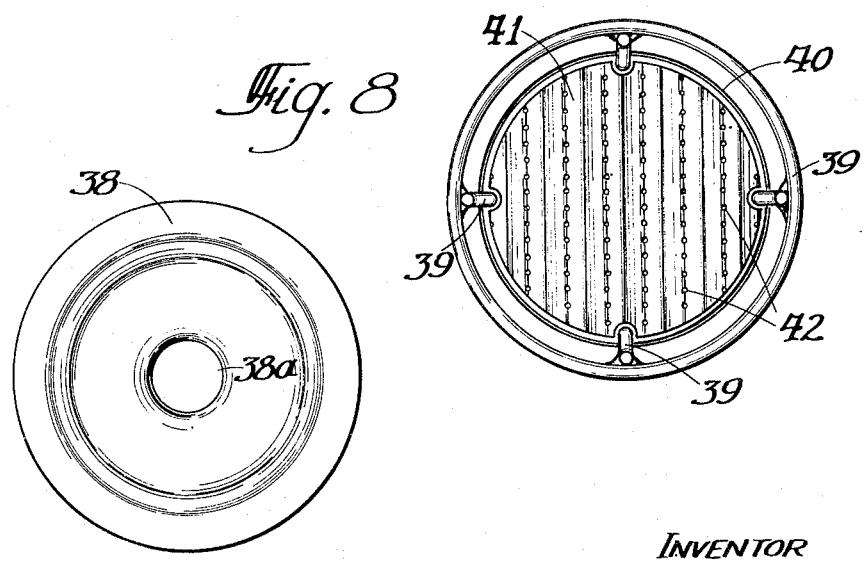
Fig. 8
Fig. 6
INVENTOR
William C. Dold
By Kegan and Kegan
Attys Patented Sept. 12, 1950

2,522,102

UNITED STATES PATENT OFFICE 2,522,102

INFUSION APPARATUS

William C. Dold, Chicago, Ill.

Application October 7, 1947, Serial No. 778,370

7 Claims. (Cl. 259—4)

1

This invention generally relates to improvements in infusion apparatus for preparing coffee beverage and the like. More specifically, the instant invention relates to improvements in infusion apparatus in which infused fluid is both collected and stored in a single container until such time as the fluid is dispensed therefrom. Infusion systems to which the instant invention is especially adapted, are exemplified by systems of the type shown and described in my co-pending application, S. N. 732,525, filed March 5, 1947, and entitled Beverage Infusion Apparatus.

Infusion apparatus capable of producing large quantities of coffee and other infused beverages has become standard equipment in hotels, restaurants and other eating establishments. In the past, the customary practice has been to place coffee grounds, for example, within a sieve-like receptacle which is suspended over a beverage storage container. Boiling or hot water is then infused upon the coffee grounds, after which the coffee beverage drips from the undersurface of the receptacle and passes into the beverage storage container in the form of a fine mist or spray. This procedure leads to little, if any, agitation of the beverage within the beverage container, since the velocity with which the descending droplets impinge upon the beverage already within the container is relatively low. Consequently, only a limited amount of mixing of the stored beverage takes place as it collects. An added disadvantage of this method of preparing beverages stems from the fact that the concentration of the beverage, and hence its specific gravity, decreases progressively as the infusion process proceeds. Since the more concentrated fluids are collected first and have a natural tendency to remain at the bottom of the storage container, it obviously follows that this condition of continually diminishing concentration tends to aggravate and intensify stratification. Due to this stagnation, the strong brew is at the bottom of the storage container, while the weak brew is at the upper portion of the storage container. As the beverage is withdrawn from the bottom of the container, therefore, its concentration continually decreases. Thus, no two cups of coffee, for example, will have the same consistency as regards to strength and aroma. In practice, this undesirable condition may be partially circumvented by recirculating a portion of the infused beverage through the coffee grounds. This procedure is to be avoided, however, if for no other reason than it is wasteful of the operator's time.

Accordingly, a principal object of my invention is to provide beverage infusion apparatus which eliminates stratification of the fluid within the beverage storage container, thereby yielding a beverage of uniform quality at all times.

Another object of the instant invention is to provide apparatus whereby the entire body of stored fluid is thoroughly agitated each time that a portion thereof is withdrawn.

A further object of my invention is to provide beverage infusion apparatus of the type set forth above which is inexpensive to construct, easily cleaned and maintained, and adaptable to conventional beverage infusion apparatus now in widespread usage.

To this end, the instant invention comprises means for collecting all beverage draining from coffee grounds or the like and feeding this beverage into the bottom portion of the storage container, whereupon it is efficiently projected into the previously collected beverage in a manner which thoroughly agitates the whole. Preferred embodiments of my invention also provide a thorough agitation of the stored beverage each time a portion thereof is withdrawn by employing two pulsating columns of the beverage, each of which alternately feeds beverage to and extracts beverage from the other column. Advantageously, embodiments of my invention may be readily adapted to conventional beverage storage containers through the use of novel conversion apparatus.

In order that my invention may be more fully disclosed, reference is had to the accompanying drawings which illustrate several forms of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said invention is not restricted to the particular details either recited in the specification or shown in the drawings.

In the drawings:

Figure 2 is a fragmentary central vertical section of a portion of the apparatus illustrated in Figure 1;

Figure 3 is a fragmentary plan view taken on line 3—3 of Figure 2;

Figure 4 is a schematic view illustrating one type of fluid flow pattern which is characteristic of apparatus conforming to the present invention;

Figure 5 is a fragmentary front elevational view, taken in central section, of another embodiment of my invention;

Figure 6 is a plan view of a portion of the apparatus shown in Figure 5;

Figure 7 is a fragmentary front elevational view of yet another embodiment conforming to my invention; and Figure 8 is a plan view of a detail of the modification shown in Figure 7.

Like reference characters designate like parts in the drawings and in the description thereof which follows.

Figure 1:
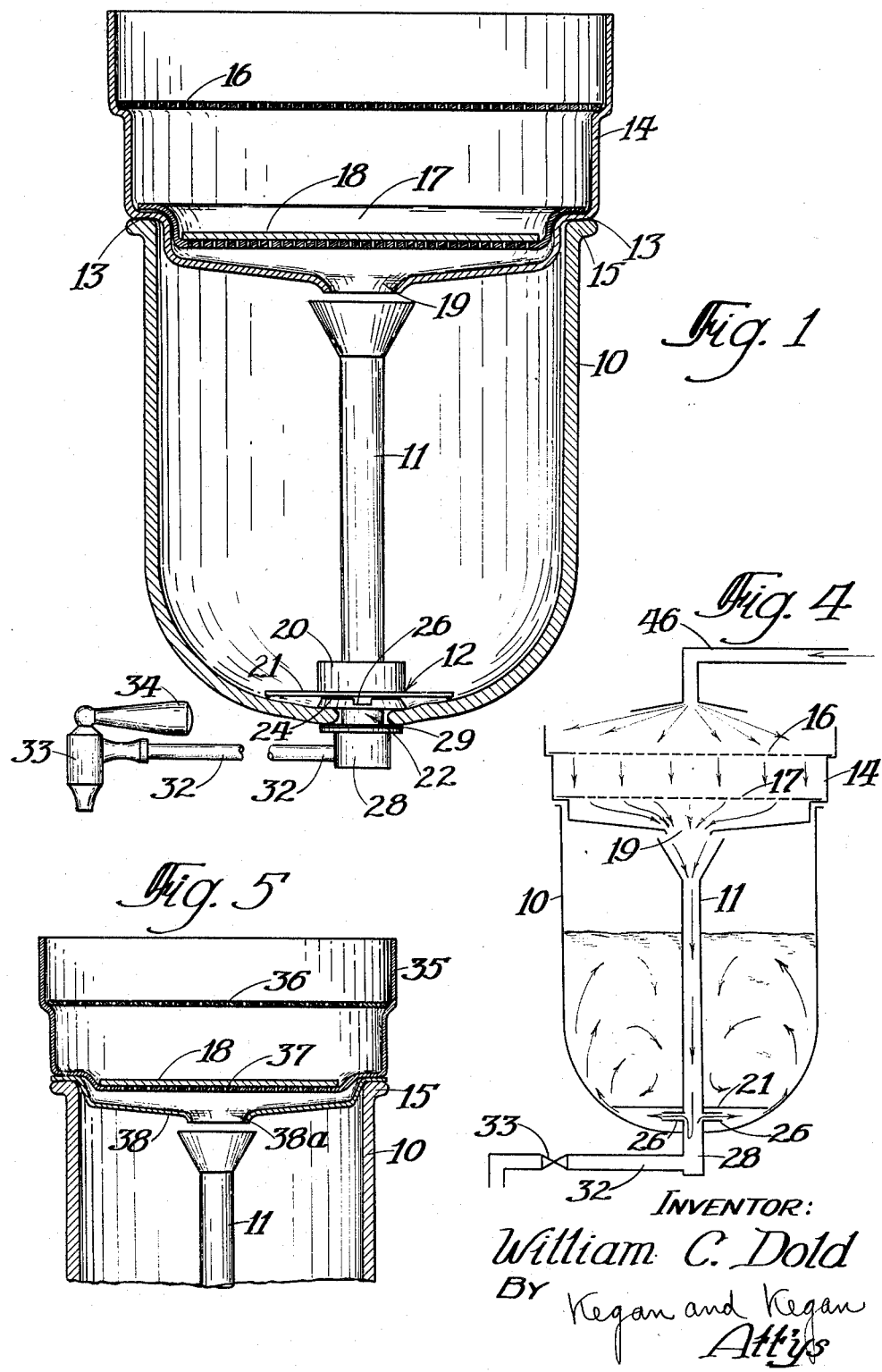
Figure 1 is a front elevational view taken substantially in central section and illustrating an embodiment of the instant invention.

Referring now to the drawings, and particularly Figure 1 thereof, the apparatus is shown as comprising an urn jar 10 having a central drainpipe 11 which is supported by and hydraulically linked with a supporting unit 12. Shoulder portion 13 of the cylindrical, stepped infusion receptacle 14 rests on and is supported by the upper flange portion 15 of the urn jar 10. The infusion receptacle 14 includes an upper perforated distributing plate 16, a bottom perforated plate 17, a filter 18, and a central drain opening 19. Coffee grounds or the like are placed within that portion of the infusion receptacle 14 contained between the plates 16 and 17.

As best shown in Figure 2, the supporting unit 12 includes a block 20 secured to the ring-shaped deflecting plate 21. The central drainpipe 11 fits into and is supported by the block 20. A toadstool 22 extends downwardly through the bottom opening 23 in the urn jar 10, and includes an upper flange portion 24, a square bore 25, two radial slots 26, 26 which traverse the flange portion 24, and an externally threaded sleeve portion 27. A flanged, internally threaded well 28 threads onto the sleeve portion 27, while a gasket 29 is interposed between the flanged well 28 and the bottom of the urn jar 10 in order to secure a hydraulic seal therebetween. A vertically disposed U-shaped strap 30 is welded or otherwise fastened onto the deflecting plate 21, and dimensioned such that it fits within the square bore 25 of the toadstool 22 in the manner best shown in Figure 3. It will be observed that this preferred arrangement prevents the supporting unit 12 and the drainpipe 11 from rotaing. Ordinarily, the deflecting plate 21 rests upon the flanged portion 24 of the toadstool 22; however, in all cases clearance between the peripheral portions of the plate 21 and the walls of the urn jar 10 is made certain by a plurality of spacer lugs 31. Beverage drains from the well 28 through an outlet pipe 32 which terminates in a drain faucet 33. The faucet 33 comprises valve means (not shown) actuated manually by the handle 34.

In operation, coffee grounds or the like are placed within the infusion receptacle 14, whence hot or boiling water is sprayed upon the distributing plate 16 by a spray head 46 shown schematically in Figure 4. After infusion has occurred, the beverage passes through the filter 18 and drains through the plate 17. As the fluid drains by gravity from the plate 17, it is collected and passed through the central drain opening 19 into the central drainpipe 11. During this stage of the infusion process, the faucet 33 is closed, hence the first portion of the infused beverage fills up the outlet pipe 32 and the well 28. As the downward flow continues, the beverage overflows the toadstool 22 through the radial slots 26, 26, whereupon it is projected radially of the deflecting plate 21. As the rapidly moving fluid strikes the walls of the urn jar 10, a circuitious or eddying flow pattern is established similar to that shown in Figure 4. As the urn jar 10 continues to fill up this efficient agitation persists.

Advantageously, my invention is designed to benefit from the fact that the specific gravity of the beverage draining into the pipe 11 is always somewhat less than that contained in the balance of the urn jar 10. Consequently, as this lighter fluid is introduced into the bottom portion of the urn jar 10, it acts to displace upwardly, while the heavier fluid already within the urn jar 10 acts to seek a lower level. Accordingly, a secondary agitation effect caused by this counterflow of fluids is superimposed upon the agitation effect caused by the rapid outward movement of the fluid around the deflecting plate 21. The total agitation effect thus obtained is more than sufficient to effect a thorough mixing of the beverage. Hence, it is unnecessary to recirculate a portion of the infused beverage through the infusion receptacle, as would ordinarily be the case.

Moreover, the fact that this efficient agitation prevails has been conclusively demonstrated by way of actual experiments conducted with operative specimens. Through the medium of transparent structural parts and chemical dyes, it has been observed that this efficient agitation occurs throughout the beverage-making process, so that stratification is eliminated and uniform beverage is always obtained.

Advantageously, apparatus of the form shown schematically in Figure 4 also acts to agitate the stored beverage within the urn jar 10 each time that a portion of said beverage is withdrawn. This feature is made possible by the particular structural arrangement used. Specifically, the beverage within the drainpipe 11 tends to flow into the well 28 more easily than does the beverage in the balance of the urn jar 10, since this latter fluid must flow through the slots 26, 26 and the narrow clearance between the deflecting plate and the walls of the urn jar 10. Hence, upon opening the drain faucet 33 the level of the beverage within the drainpipe 11 falls more rapidly than does the level of the other beverage stored within the urn jar 10. Accordingly, the fluid system is momentarily unbalanced when the drain faucet 33 is closed, that is, the level of the main body of beverage is higher than that of the beverage remaining within the drainpipe 11. As the system attempts to reach a state of equilibrium, inertia effects cause the two columns to pulsate back and forth for a finite period of time. As a result, the entire body of beverage is agitated. It will thus be seen that the beverage is thoroughly agitated each time that a small quantity is withdrawn, with the result that beverage may be dispensed from the urn jar 10 over a long period of time without the stored beverage becoming stratified and stagnated.

In addition to the foregoing operational advantages of my invention, it possesses an added advantage in that it may also be readily adapted to a large majority of conventional infusion apparatus already in use. Many of these apparatuses have toadstools similar to the toadstool 22 shown in Figures 1–3, while virtually all of these units have a bottom vent. While it is preferable to lock the unit 12 against rotation by means of the U-shaped strap 30 shown, the utility of my invention is not appreciably diminished in the event that the strap 30 is anchored within a circular opening. Regardless of the type of urn jar construction employed, the unit 12 and drainpipe 11 may be both easily installed for preparation of the beverage and conveniently removed for cleansing.

The present invention also incorporates means for utilizing conventional infusion receptacles, such as the receptacle 35 shown in Figure 5, for example, in conjunction with the unit 12 and the pipe 11. As further indicated in Figure 5, the receptacle 35 includes an upper distributing plate 36 and a plurality of perforations 37 in the lower surface thereof. In order to collect the beverage draining from the perforations 37 and funnel it into the central drainpipe 11, a funnelling plate 38, as shown in Figures 5 and 6, is interposed between the receptacle 35 and the flange portion 15 of the urn jar 10. Thus, in effect, the funnelling plate 38 converts the receptacle 35 into a structure similar in utility to the receptacle 14 shown in Figure 1, since all of the drainage from the receptacle 35 passes into the drainpipe 11 through a central opening 38a.

On the other hand, many users of beverage infusion apparatus prefer to use a fabric or porous bag to hold coffee grounds or like material. Where this preference exists, the embodiment shown in Figure 7 may be used to advantage. Specifically, this structure includes a framework 39 which is supported by the flange portion 15 of the urn jar 10 and which in turn supports a flanged plate 40. A corrugated drainage board 41 having a plurality of perforations 42 is placed within and supported by the flange plate 40. The fabric or porous infusion bag, indicated by the numeral 43, is suspended within the framework 39 by means of a ring 44. When the bag 43 is filled with coffee grounds or the like, the bottom portion thereof assumes the configuration of the board 41, as shown in Figure 7. Thus, when hot water is passed through the coffee grounds or the like, the resultant beverage tends to drain from the entire surface of the bag 43 which is in contact with the board 41, whence it passes into the central drainpipe 11 through the central opening 45. Besides making it possible to use an infusion bag with my efficient infusion process, the structure shown in Figure 7 also possesses the added advantage of increasing the effective drain area of the infusion bag 43. Were the coffee bag 43 to be merely suspended within the urn jar 10, as is ordinarily the case, the hot water would tend to descend downwardly through the coffee grounds or like material in a more or less inverted conical pattern and drain only from the nethermost point of the infusion bag. Consequently, much of the material without this conical volume would perform no useful function. My invention, however, greatly increases the drainage area of the coffee bag 43, so that an efficient utilization of all of the coffee grounds or the like is realized.

Taking the above described apparatus as a whole, it is apparent that in every case complete agitation of the beverage within the urn jar 10 is obtained during the initial processing of the beverage. This feature readily eliminates stratification and stagnation of the stored beverage and results in a more uniform and desirable beverage. Furthermore, each time that a portion of the stored beverage is withdrawn from the urn jar 10, the columns of fluid within the drainpipe 11 and the urn jar 10 pulsate up and down, thereby further insuring that the beverage will at all times be uniform. This feature results from a critical dimensioning of the flow passageway which I have selected. And, as indicated above, my invention may be inexpensively and conveniently adapted to virtually all beverage infusion apparatus in which an infusion receptacle is suspended over the storage and dispensing container.

It is thus apparent that the objects of my invention have been fulfilled and that the apparatus described represents an advance over the infusion apparatus of the prior art. While I have shown and described certain embodiments of my invention, however, it is strictly to be understood that these embodiments have been given by way of example only and that various changes and rearrangements of the details shown and described herein may be made without departing from the spirit of my invention, the scope of which is defined in the appended claims.

What I claim is:

1. In an infusion system of the class wherein infused fluid is collected and stored within a receptacle, means for obtaining an effective agitation of the stored fluid as fluid is added thereto and withdrawn therefrom, said means comprising: a first conduit piercing the bottom of said receptacle and extending upwardly therefrom for a short distance, said conduit having a bore of substantially square cross section, a baffle plate supported by the upper end portion of said first conduit, detent means on said plate extending into said first conduit to prevent rotational movement therebetween, a second conduit piercing said baffle plate and extending upwardly therefrom, said second conduit being aligned with said first conduit, one or more ports in said first conduit connecting said receptacle and said aligned conduits, and means for funnelling substantially all of said infused fluid into said second conduit.

2. In an infusion system of the class wherein infused fluid is collected and stored within a receptacle, means for obtaining an effective agitation of the stored fluid as fluid is both added thereto and withdrawn therefrom, said means comprising: a first conduit piercing the bottom of said receptacle and extending upward therefrom for a short distance, a baffle plate superjacent the upper end of said first conduit, the outer edges of said baffle plate being spaced away from said bottom, a second conduit piercing said baffle plate and extending upwardly therefrom, said second conduit being aligned with said first conduit, one or more flow passageways extending through said first conduit and opening into that portion of said receptacle below said baffle plate, and means for funnelling substantially all of said infused fluid into said second conduit.

3. In infusion apparatus wherein infused fluid is collected and stored within a receptacle, means for agitating the stored fluid when fluid is both added thereto and withdrawn therefrom, said means comprising: a drain pipe in the bottom of said receptacle, a peripheral flange on the upper end of said drain pipe, the upper surface of said flange traversed by a plurality of slots, valve means in said drain pipe, a baffle plate superjacent said drain pipe, said slots providing flow passageways connecting said receptacle and said drain tube, the combined effective flow area of said passageways being less than the flow area of said drain tube, a supply tube piercing said baffle plate and aligned with said drain pipe, means spacing the edge portion of said baffle plate a short distance away from the bottom, inner surface of said receptacle, and means for funnelling substantially all of said infused fluid into said supply tube, whereby when said valve means are opened fluid drains more readily from said supply tube into said drain pipe than from said receptacle through said flow passageways comprising said slots.

4. In a fluid system of the class wherein fluid is collected and stored within a receptacle for dispensing in relatively small quantities, means for agitating the stored fluid when fluid is both added thereto and withdrawn therefrom, said means comprising: a conduit piercing the bottom of said receptacle and having a peripheral flange on the upper end portion thereof, said flange having one or more slots traversing the upper surface thereof, a baffle plate fitting closely over said first conduit, the outer edges of said baffle plate being spaced a short distance away from the interior surface of said receptacle, a tube piercing said baffle plate and extending upwardly therefrom, said tube being substantially aligned with said first conduit, and means for funnelling substantially all of said fluid into said tube, whereby fluid flows from said tube into said receptacle through said slots in said flange, and whereby fluid in said receptacle flows into said conduit through said slots.

5. In infusion apparatus wherein infused fluid is collected and stored within a receptacle, means for agitating the stored fluid when fluid is both added thereto and withdrawn therefrom, said means comprising: a drain line piercing said receptacle, a baffle plate fitting closely over that end of said drain line positioned within said receptacle and spaced away from the interior surface of said receptacle, said drain line having one or more slots traversing said one end thereof, said slots communicating said drain line with the interior of said receptacle, a supply tube piercing said baffle plate and substantially aligned with said drain line, the combined effective flow area of said slots being less than the flow area of either said drain line or said supply tube, and means for funnelling substantially all of said infused fluid into said supply tube.

6. In apparatus wherein fluid is collected and stored within a receptacle for dispensing in relatively small quantities over a period of time, means for agitating the stored fluid when fluid is both added thereto and withdrawn therefrom, said means comprising: a drain line piercing the bottom of said receptacle and terminating a short distance above said receptacle bottom; valve means in said drain line; a supply line positioned to discharge into said drain line, the upper end of said drain line and the lower end of said supply line contoured to form in combination one or more flow passageways interconnecting said lines and said receptacle, the effective flow area of said flow passageways being substantially less than the flow area of either of said lines, whereby upon opening said valve means fluid in said supply line discharges into said drain line more readily than does the balance of the fluid within said receptacle; and baffle means positioned above said flow passageways to direct fluid flowing from said passageways into said receptacle substantially radially of said drain line.

7. In apparatus wherein fluid is collected and stored within a receptacle for dispensing in relatively small quantities, means for agitating the stored fluid when fluid is both added thereto and withdrawn therefrom, said means comprising: a drain line extending into the interior of said receptacle; valve means in said drain line; a supply line positioned to discharge into said drain line, the ends of said lines contiguous to each other contoured to form in combination one or more flow passageways interconnecting said lines and said receptacle, the effective flow area of said flow passageways being substantially less than the flow area of either of said lines, whereby upon opening said valve means fluid in said supply line discharges into said drain line at a greater rate than fluid in said receptacle discharges into said drain line through said flow passageways; and baffle means positioned within said receptacle to direct the flow of fluid from said passageways laterally of said drain line.

WILLIAM C. DOLD.

REFERENCES CITED

The following references are of record in the file of this patent:

UNITED STATES PATENTS

| Number | Name | Date |
| --- | --- | --- |
| 91,333 | Heiss et al. | June 15, 1869 |
| 960,419 | Selg | June 7, 1910 |
| 1,025,206 | Rounds | May 7, 1912 |
| 1,549,840 | Lemoine | Aug. 18, 1925 |
| 1,601,987 | Topper | Oct. 5, 1926 |
| 1,710,218 | Kelly | Apr. 23, 1929 |
| 2,047,134 | Coleman | July 7, 1936 |
| 2,234,397 | Bentz | Mar. 11, 1941 |
| 2,252,076 | Juterbock | Aug. 12, 1941 |
| 2,414,521 | Gunther | Jan. 21, 1947 |
| 2,437,601 | Hamlet | Mar. 9, 1948 |
| 2,437,768 | Timberlake | Mar. 16, 1948 |
| 2,464,478 | Auer | Mar. 15, 1949 |